(12) United States Patent
Gal et al.

(10) Patent No.: US 7,570,437 B2
(45) Date of Patent: Aug. 4, 2009

(54) OMNI-DIRECTIONAL IMAGING AND ILLUMINATION ASSEMBLY

(75) Inventors: Ehud Gal, Reut (IL); Gennadiy Liteyga, Ashkelon (IL); Gil Graisman, Reut (IL)

(73) Assignees: O.D.F. Optronics, Ltd., Tel Aviv (IL); O.D.F. Medical Ltd., Tel Aviv (IL)

(*) Notice: Subject to any disclaimer, the term of this patent is extended or adjusted under 35 U.S.C. 154(b) by 599 days.

(21) Appl. No.: 10/530,459

(22) PCT Filed: Oct. 27, 2003

(86) PCT No.: PCT/IL03/00884

§ 371 (c)(1),
(2), (4) Date: Nov. 15, 2005

(87) PCT Pub. No.: WO2004/042428

PCT Pub. Date: May 21, 2004

(65) Prior Publication Data

US 2006/0152819 A1    Jul. 13, 2006

(30) Foreign Application Priority Data

Nov. 4, 2002    (IL) .................................... 152628

(51) Int. Cl.
*G02B 13/06* (2006.01)

(52) U.S. Cl. ................... 359/725; 359/648; 359/708; 359/710; 359/718

(58) Field of Classification Search .............. 359/648, 359/708, 710, 718, 725
See application file for complete search history.

(56) References Cited

U.S. PATENT DOCUMENTS 4,899,277 A    2/1990    Iizuka et al.
5,282,016 A    1/1994    Shen et al.

(Continued)

FOREIGN PATENT DOCUMENTS

WO    02/059676    8/2002

(Continued)

*Primary Examiner*—Evelyn A. Lester
(74) *Attorney, Agent, or Firm*—Ladas & Parry LLP

(57) ABSTRACT

In a first aspect, the present invention provides an omni-directional imaging assembly. In the preferred embodiment the assembly of the invention comprises a solid omni-directional lens comprising a vertical axis of symmetry; an upper surface, at least part of which is capable of reflecting rays that arrive from the inner side of the omni-directional lens; a transparent perimeter surface; a lower convex surface, at least part of which is capable of reflecting rays that arrive from the direction of the perimeter surface; and a transparent circular surface maintained in the lower convex surface around the vertical axis of symmetry. The light rays from a first 360 degrees, panoramic, scene are refracted by the transparent perimeter surface, are then reflected by the lower convex surface towards the upper surface, and then reflected by the upper surface towards the transparent circular surface, where they are refracted and exit the omni-directional lens. In a second aspect the omni-directional imaging assembly of the invention can be combined with an illumination source to simultaneously provide both omni-directional imaging and omni-directional illumination. Also described are embodiments of the invention that comprise image capturing devices, embodiments that enable simultaneous imaging of the first scene and a second scene, and embodiments that are adapted to the requirements of endoscopic imaging.

31 Claims, 14 Drawing Sheets

U.S. PATENT DOCUMENTS

| | | |
|---|---|---|
| 5,774,569 A | 6/1998 | Waldenmaier |
| 5,790,182 A | 8/1998 | St. Hilaire |
| 5,854,713 A | 12/1998 | Kuroda et al. |
| 6,028,719 A | 2/2000 | Beckstead et al. |
| 6,157,018 A | 12/2000 | Ishiguro et al. |
| 6,222,683 B1 | 4/2001 | Hoogland et al. |
| 6,341,044 B1 | 1/2002 | Driscoll, Jr. et al. |
| 6,388,820 B1 | 5/2002 | Wallerstein et al. |
| 6,424,377 B1 | 7/2002 | Driscoll, Jr. et al. |
| 6,426,774 B1 | 7/2002 | Driscoll, Jr. et al. |
| 6,449,103 B1 | 9/2002 | Charles |
| 6,597,520 B2 | 7/2003 | Wallerstein et al. |
| 7,019,918 B2 * | 3/2006 | Wallerstein et al. ......... 359/725 |
| 2001/0010555 A1 | 8/2001 | Driscoll, Jr. |
| 2002/0126395 A1 | 9/2002 | Gianchandani et al. |
| 2002/0154417 A1 | 10/2002 | Wallerstein et al. |
| 2002/0159166 A1 | 10/2002 | Herman et al. |
| 2003/0095338 A1 | 5/2003 | Singh et al. |

FOREIGN PATENT DOCUMENTS

| | | |
|---|---|---|
| WO | 03/026272 | 3/2003 |
| WO | 03/046632 | 6/2003 |

* cited by examiner

OMNI-DIRECTIONAL IMAGING AND ILLUMINATION ASSEMBLY

FIELD OF THE INVENTION

The present invention relates to the field of omni directional imaging and illumination. More specifically, it relates to optical structures that enable the coverage and illumination of a panoramic or nearly spherical field of view, suitable for video or still imaging in both well-lit environments as well as dark environments.

BACKGROUND OF THE INVENTION

The use of imaging equipment has penetrated, over the years, into almost every field and has become an essential aid for accomplishing a variety of tasks. Imaging equipment is used in a wide range of security systems, to monitor sensitive locations and facilities, and to provide a reliable and cost-effective solution for perimeter security. An additional use for imaging equipment is in the military, where image-based systems are used for reconnaissance gathering, enhanced situational awareness, automatic navigation and for many additional human-operated as well as automated systems.

In the medical field imaging devices are also used; during endoscopic procedures, for example, a surgical scope is inserted into body cavities for imaging the inner body for diagnostic and surgical purposes.

Imaging devices are used in many additional fields, some commercial, and others for private, home use, for purposes of entertainment, photography and even baby monitoring.

Prior art techniques of imaging rely on the use of an image sensing device equipped with an optical lens. The prior art optical lenses are designed to cover a specific-sized field of view, and transmit this field of view to be captured by the image sensing device. While most optical lenses presented in the prior art provide the ability to capture a field of view limited in its aperture, a need exists to capture an unlimited field of view, or an omni-directional field of view, i.e. a panoramic (cylindrical) field of view or a nearly spherical field of view.

An optical lens that covers an omni-directional field of view and enables the image sensing device to capture that omni-directional scene simultaneously would provide significant improvement to imaging devices. The omni-directional scene that would be covered would enable constant awareness of the omni-directional scene. The advantages of such an optical lens are obvious—security systems will have no "dead zones" and will constantly cover and monitor the omni-directional scene. Medical scopes will provide the surgeon with the ability to view the entire environment in which he operates and avoid the risk of injuring inner body tissue or cause breach of blood vessels which were previously obscured from his view. Military systems will also benefit from the ability to view an omni-directional scene and so will most systems based on image sensing, whose performance is currently limited by the limited aperture provided by their optical lenses.

Some techniques of panoramic imaging have been presented in prior art, and those make use of several image capture devices, each one aimed at a different sector limited in width, combined in a manner that all of them together, when properly aligned, cover a full 360 degrees field of view. Another prior art method for panoramic imaging relies on a single image capture device, rotated around a vertical axis. In this method the image capturing device covers a limited sector at any single moment, but while completing a full rotation, it creates a sequence of images which are combined together to a panoramic image. In this method it is impossible to see simultaneously and in real-time the omni-directional scene.

The main disadvantage of the above mentioned prior art methods is their relative complexity. Some of the prior art methods necessitate moving/rotating mechanisms, require frequent alignment and very often turn out to be maintenance-intensive.

A different prior art approach makes use of axis-symmetric reflective surfaces, used to reflect an omni-directional field of view towards a single image-capture device. In this approach a circular image is formed on the focal plane array of the image capture device. The shape of the image derives from the reflection of the surrounding field of view by the reflective surface. The image shape and possible aberrations are corrected by image processing techniques. A sub-group of the said technique makes use of two reflective surfaces designed to doubly reflect the omni-directional field of view towards the image capture device. Such a design is described in U.S. Pat. No. 6,426,774. In the said patent, a convex axis-symmetric reflective surface reflects a cylindrical field of view towards a flat reflective surface located coaxially with it. A circular image is reflected from the convex axis-symmetric surface towards the flat reflective surface and then reflected towards an image capture device, which is located at the concave side of the convex reflective surface, through a hole located at the center of the axis-symmetric convex reflective surface.

Additional methods have been developed to achieve capture of an enlarged field of view of an almost spherical scene. Such a design is described in WO02/059676, the description of which, including reference cited therein, is incorporated herein by reference in its entirety. In the said publication, two reflective surfaces are used, in both of which a transparent area is formed at the center to enable penetration of beams originating at an additional scene, which is not covered by the reflective surfaces. As a result of the unique design, a nearly spherical field of view is captured, comprising a cylindrical field of view doubly reflected by the reflective surfaces towards the image capture device, and an additional field of view penetrating through the said transparent areas towards the image capture device. The said transparent areas may be fabricated either as transparent surfaces or as optical lenses which enhance the properties of the additional scene.

The mentioned prior art techniques represent methods of acquiring a large field of view, using optical structures which comprise several separate optical components.

In view of the deficiencies of the prior art, it would be desirable to provide an optical lens that enables coverage of a panoramic or nearly spherical field of view by utilizing a monolithic optical block, which incorporates all refractive and reflective surfaces needed to acquire the scene. As a result of the shape of such an optical block and its surfaces, aberrations would be reduced to an acceptable level and generally there would be need of additional correction lenses along the optical path, thus simplifying the optical design and structure and reducing production costs.

It is therefore an object of the present invention to provide such an optical lens designed to cover a panoramic field of view.

It is another object of the present invention to provide an optical lens designed to cover a nearly spherical field of view.

It is yet another object of the present invention to provide methods of illuminating the omni-directional scene that is to be imaged, using an optical lens as both the omni-directional illumination distributor and as the optical element designed to collect the image of the omni-directional scene.

Additional objects of the invention would become apparent as the description proceeds.

SUMMARY OF THE INVENTION

In a first aspect, the present invention provides an omni-directional imaging assembly. In the preferred embodiment the assembly of the invention comprises a solid omni-directional lens which comprises:
  (a) a vertical axis of symmetry;
  (b) an upper surface, at least part of which is capable of reflecting rays that arrive from the inner side of the omni-directional lens;
  (c) a transparent perimeter surface;
  (d) a lower convex surface, at least part of which is capable of reflecting rays that arrive from the direction of the perimeter surface; and
  (e) a transparent circular surface maintained in the lower convex surface around the vertical axis of symmetry.

The light rays from a first 360 degrees, panoramic, scene are refracted by the transparent perimeter surface, are then reflected by the lower convex surface towards the upper surface, and then reflected by the upper surface towards the transparent circular surface, where they are refracted and exit the omni-directional lens.

In one preferred embodiment of the omni-directional imaging assembly of the invention, at least a part of the upper surface of the omni-directional lens is coated with reflective material on its exterior side to enable reflection of rays that arrive at the upper surface from the interior of the omni-directional lens. Alternatively or additionally, at least a part of the lower convex surface of the omni-directional lens is coated with reflective material on its exterior side to enable reflection of rays that arrive at that part of the lower convex surface from the direction of the perimeter surface. The upper surface and/or the lower convex surface of the omni-directional lens can be designed to enable reflection of rays that arrive at those surfaces without the use of a reflective coating by the use of total internal reflection.

In another embodiment, the omni-directional imaging assembly of the invention can further comprise a second transparent circular area maintained in the upper surface of the omni-directional lens around the vertical axis of symmetry. The second transparent circular area enables penetration of rays from a second scene, which is at least partially different than the first scene, into the omni-directional lens. Rays from the second scene travel through the omni-directional lens, are refracted by the transparent circular surface in the lower surface, and exit the omni-directional lens.

The omni-directional imaging assembly of this last embodiment can further comprise an optical structure located coaxially with the omni-directional lens and above its upper surface. This optical structure is designed to control and enhance optical qualities of the second scene, before rays originating in the second scene are refracted by the second transparent circular area. The optical structure can be designed to control the aperture of the second scene. The optical structure can comprise a plurality of optical elements.

The omni-directional imaging assembly of the invention can further comprise an image capture device. The image capture device is directed towards the transparent circular surface in the lower surface of the omni-directional lens and its optical axis coincides with the vertical axis of symmetry of the omni-directional lens. The image capture device can comprise a focusing lens.

The omni-directional imaging assembly may further comprise a connector located between the omni-directional lens and the image capture device. The connector has a first edge and a second edge. Optical transparency exists between the two edges, thereby allowing light which penetrates the first edge to reach and exit through the second edge essentially without distortion. The connector can be cylindrical in shape. The first edge of the connector can be designed to be connected to the omni-directional lens and the second edge of the connector can be designed to be connected to the image capture device. The distance between the first edge of the connector and the second edge can be designed to allow optimal focus by the image capture device of the image that arrives from the direction of the omni-directional lens. The connector can be fabricated together with, and as a part of, the omni-directional lens as a unified optical block.

In a preferred embodiment of the invention the side edges of the connector have a transparent volume allowing rays that arrive from the second edge to travel through the side edges, to exit through the first edge, and to enter the omni-directional lens.

In a second aspect the omni-directional imaging assembly of the invention can be combined with an illumination source to provide omni-directional illumination.

To accomplish the goal of providing omni-directional illumination, the omni-directional imaging assembly of the above mentioned embodiment of the invention can further comprise an illumination source located adjacent to the second edge of the connector. The illumination source transmits illumination towards the transparent volume of the connector. The illumination rays travel through the transparent volume of the connector, penetrate the omni-directional lens, and are distributed omni-directionally by the reflective and refractive surfaces of the omni-directional lens. In this way omni-directional illumination is provided. In order to absorb stray light and preventing glare, the outer surface of the side of the connector can be blackened by a coating or by the presence of a mechanical element.

The omni-directional imaging assembly of the invention can further comprise an illumination source located adjacent to the transparent area in the lower convex surface. This illumination source distributes illumination towards the interior of the omni-directional lens. The lens refracts and reflects these illumination rays distributing them omni-directionally, thereby providing omni-directional illumination.

The illumination source in all embodiments of the invention can comprise a plurality of illumination sources and be capable of illumination at several different wavelengths. In all embodiments of the invention, the fabrication material and coating material of the omni-directional lens must be suitable to distribute the spectral range of the illumination.

In some embodiments of the invention, the upper surface and/or the lower convex surface of the omni-directional lens can be described by more than one geometrical curve.

An embodiment of the omni-directional imaging assembly of the invention further comprises a hole extending from the upper surface of the omni-directional lens to the lower convex surface. The hole is around the vertical axis of symmetry and is designed such that rays from the second scene travel through the hole to pass through the omni-directional lens. An optical element can be placed within the hole to control the quality of the image of the second scene. The outside surface of the optical element that is placed in the hole can be coated with black coating to absorb light and prevent glare. Additionally or alternatively, the surface of the hole can be coated with black coating to absorb light and prevent glare. The hole can be cylindrical or conical in shape.

The omni-directional imaging assembly of the invention can further comprise cylindrical slots in the body of the omni-directional lens around the axis of symmetry to absorb stray light and prevent glare. The slots are formed in size and angle such as to not interfere with the optical path of rays originating in scenes that should be covered by the omni-directional lens.

The omni-directional imaging assembly of the invention may further comprise a prism and an illumination source. The prism is located coaxially with the omni-directional lens and the illumination source is located to the side of and directed towards the prism. The prism is designed and positioned such as to transmit rays that arrive from the direction of the omni-directional lens to the desired location, i.e. in most instances to the image capture device, and to refract illumination rays originating at the illumination source towards the omni-directional lens.

Another embodiment of the omni-directional imaging assembly of the invention can further comprise an image capture device located above and adjacent to the upper surface. This image capture device is directed opposite to the omni-directional lens and is designed to cover an additional scene, at least partially different from the first scene.

In yet another embodiment of the omni-directional imaging assembly of the invention, the omni-directional lens further comprises a hole to the side of the vertical axis of symmetry. This hole extends from the upper surface to the lower surface of the lens and comprises a mechanical channel. The mechanical channel can be used to pass gases, liquids, or mechanical devices through the mechanical channel for cleaning the exterior of the omni-directional lens. The mechanical channel can also be used to pass surgical instruments through the omni-directional lens.

All the above and other characteristics and advantages of the invention will be further understood through the following illustrative and non-limitative description of preferred embodiments thereof, with reference to the appended drawings.

BRIEF DESCRIPTION OF THE DRAWINGS

With specific reference now to the drawings in detail, it is stressed that the particulars shown are by way of example and for purposes of illustrative discussion of preferred embodiments of the present invention only. No attempt is made to show in the drawings structural details of the invention in greater detail than is necessary for understanding of the invention. Details not shown in the figures are readily understood by the skilled person who will easily appreciate how the several forms of the invention may be carried out.

In the drawings.

DETAILED DESCRIPTION OF THE INVENTION

A first embodiment of the present invention provides a panoramic imaging assembly based on a unique optical block. The optical block is designed to collect light rays from a surrounding 360 degrees field of view and reflect them towards an image capture device located coaxially with it. The optical block is designed to have a transparent upper surface coated with reflective material on its exterior side, a perimeter transparent surface and a lower convex transparent surface, which in some embodiments is coated with reflective material on its exterior side. A transparent circular surface is maintained at the center of the lower convex transparent surface and is designed to allow light rays that arrive from the direction of the upper surface to exit the optical block and reach the image capture device. It is stressed that the exact structure of the optical block and the exact formulas describing its curves are subject to precise optical design. Proper optical design will preserve maximum quality of the image that is refracted and reflected by the optical block. It is further noted that the coverage range of the vertical field of view is also subject to the optical design and can be controlled by the optical design. The optical design also dictates the required distance between the optical block and the image capture device to ensure optimal focus by the image capture device on the image that is reflected from the optical block. Given the detailed description provided herein, the method of determining the values of the various parameters needed to create the exact design and of determining the actual design for a given application would become apparent to those skilled in the art.

Figure 1:
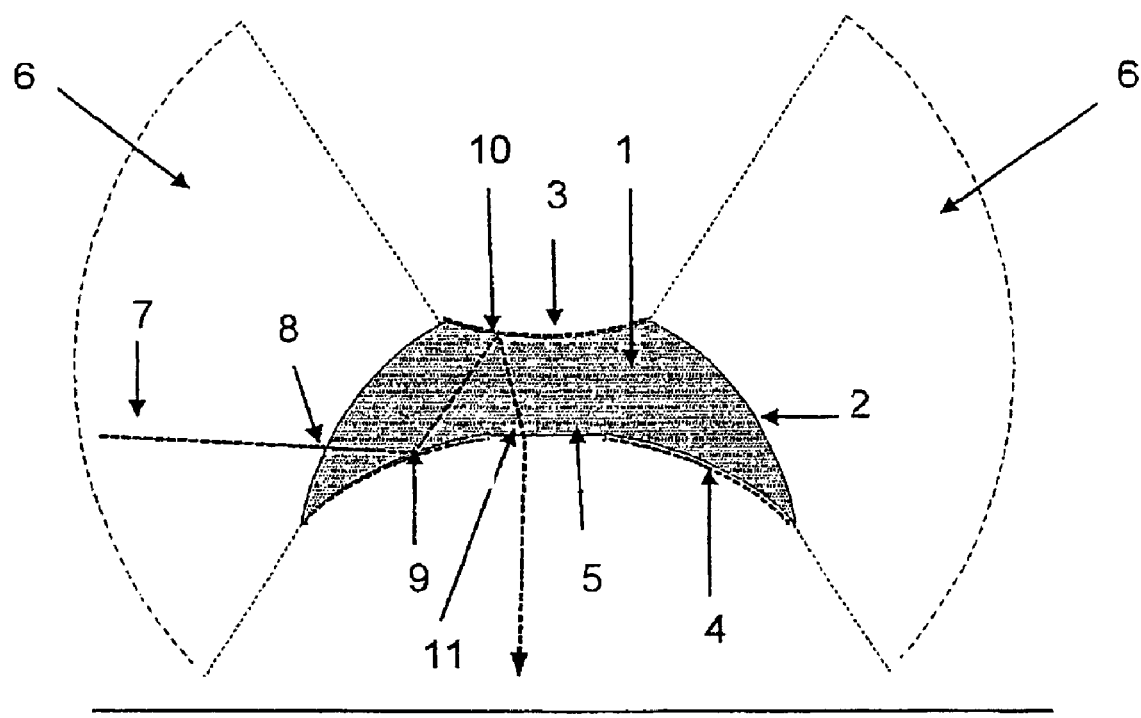
FIG. 1 schematically describes an optical block that enables coverage of a 360 degrees panoramic field of view, and the optical path of a representative light ray that travels through the optical block.

FIG. 1 is a schematic description of a monolithic optical block designed for coverage of 360 degrees panoramic surroundings. The optical lens (block) (1) is fabricated as a single solid optical element comprising a transparent perimeter surface (2), a transparent upper surface (3), a transparent lower convex surface (4) and a circular transparent surface (5) located at the center of the lower convex surface (4). The transparent lower convex surface (4) is coated with reflective material on its exterior side (in some embodiments), which is designed to reflect light rays, which originate in a 360 degrees field of view (6) surrounding the axis of the lens, towards the upper surface (3). The upper surface (3) is coated with reflective material on its exterior side, which is designed to reflect light rays, which arrive from the direction of the lower convex surface (4), towards the circular transparent surface (5) and from there to an image capture device (not shown) located at the concave side of the lower convex surface (4). It is stressed that the circular transparent surface (5) may be fabricated with a different geometry than that of the lower convex surface (4) for the purpose of correcting some of the aberrations that may occur as a result of the reflections and refractions of rays inside the lens (1). It is further stressed that the curvature of the upper surface (3) may be designed in several ways to control the quality of the image that is reflected by the optical lens (1) and to aid in the ability of the image capture device to acquire an image with minimal aberrations and maximum focus. Those skilled in the art will appreciate that the perimeter surface (2), the lower convex surface (4), the upper surface (3) and the transparent circular surface (5) are all designed and determined with mutual consideration of each other's affects on the rays that penetrate the lens (1). Proper optical design will achieve both coverage of a vertical field of view as required by the application, along with control over the level of aberration and astigmatism of the image that is reflected by the optical lens (1).

It is noted, that in some embodiments of the present invention, the lower surface (4) may be only partly coated with reflective material or not coated at all, and still have the ability to reflect light rays from the perimeter scene towards the upper surface (3). The reflection may be achieved, by use of Snell's law of Total Internal Reflection in the optical design.

Reference is now made to the optical paths of light rays originating in the 360 degree field of view (6) surrounding the lens and located within the vertical field of view of the optical lens (1). A light ray (7) represents a group of light rays originating at the field of view (6) that is covered by the optical lens (1). The light ray (7) hits the perimeter refractive surface (2) at a first point (8) where it is refracted and penetrates the optical lens (1). It then travels through the optical lens (1) and hits the lower surface (4) at a second point (9), where it is reflected towards the upper surface (3). The reflection at lower surface (4) may be achieved either by coating the surface with reflective coating from its exterior or as a result of a Total Internal Reflection effect. After hitting the lower surface (4) at the second point (9), the first light ray (7) travels through the optical lens (1) and hits the upper surface (3) at a third point (10). When hitting the upper surface (3), the first light ray (7) is reflected towards the circular transparent area (5), and hits the circular area (5) at a fourth point (11), where it is refracted and exits the lens towards the image capture device (not shown). The reflection of the ray from the upper surface (3) results from the existence of the reflective coating on the exterior of the upper surface (3), or in some cases, as an effect of Total Internal Reflection. Similar paths can be described in reference to any other light ray originating within the field of view (6), which is covered by the lens (1). It is stressed that each of the light rays originating from a different angle will hit different points of the aspheric optical lens, and will naturally have a different optical path.

Figure 2:
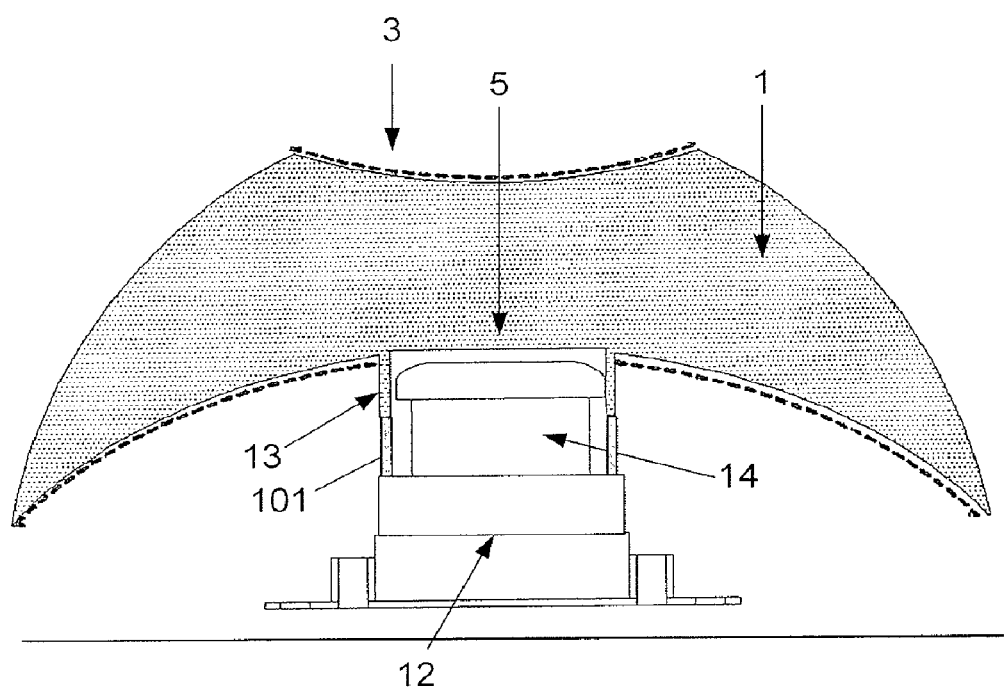
FIG. 2 schematically describes an incorporation of an image capture device and an optical block of the present invention, to provide an image of a 360 degrees panoramic field of view.

FIG. 2 illustrates an entire imaging assembly, which utilizes the optical block described in FIG. 1, to enable the capture of a 360 degrees panoramic image. The imaging assembly comprises the optical lens (block) (1) and an image capture device (12). The image capture device (12) is directed towards the transparent circular surface (5), designed to capture the image that is doubly reflected from the upper surface (3) and refracted by the transparent surface (5). The optical axis of the image capture device (12) preferably coincides with the axis of symmetry of the axis-symmetric optical lens (1). The distance between the image capture device (12) and the optical lens (1) is determined according to the parameters of the optical design, with the purpose of ensuring maximum focus of the image that arrives from the direction of the optical lens (1) by the image capture device (12). To ensure a fixed distance between the image capture device (12) and the optical lens(1), the lens (1) may be fabricated together with an attachment area (13), designed for direct mounting on the image capture device (12). In some cases, when a larger distance is required between the lens (1) and the image capture device (12), a connector (101) (see FIG. 2) may be incorporated between the two said elements, connected at one end to the attachment area (13) of the lens (1) and at its second end to the image capture device (12). It is stressed that the length of the connector (101) is designed in accordance with the optical design, to ensure optimal focus by the image capture device (12) on the image that arrives from the direction of the lens (1). It is further stressed that the connector (101) may be fabricated as a continuation of the optical block, thus forming a single monolithic optical structure designed for direct mount on an image capture device (12). The image capture device (12) is preferably equipped with its own focusing lens (14), which is set to focus the image that should be captured by the image capture device (12). Those skilled in the art will appreciate that the focusing lens is chosen and adjusted in accordance with the distance between the image capture device (12) and the optical block (1), and according to the specifications of the optical design. As previously noted, the distance between the image capture device (12) and the optical block (1) is determined by the optical design to ensure both optimal focus of the image and preferably that the entire image that is reflected by the optical block (1) and no more than that image, is captured by the image capture device (12), thus allowing optimal image resolution. For some applications, which may require improved image quality, additional lenses (not shown) may be incorporated in between the focusing lens (14) and the optical block (1), designed to correct astigmatism of the image prior to its capture by the image capture device (12). It is stressed, however, that proper optical design of the optical block (lens) (1) will reduce such astigmatism to a tolerable level suitable for most applications, and that generally additional optical elements, other than the optical block (lens) (1) and the focusing lens (14), are not required. The assembly as described herein will result in acquiring an image of a circular shape, which is actually the reflection of the panoramic surroundings, as further described in reference to FIG. 3.

Figure 3:
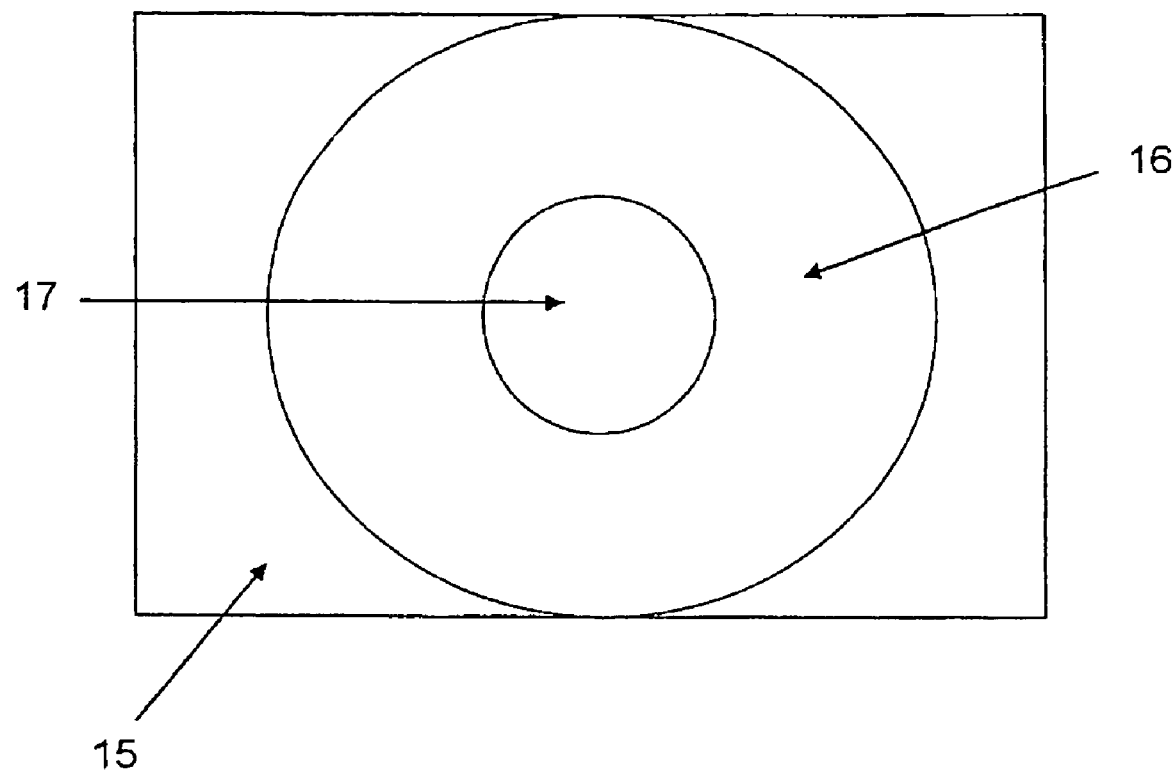
FIG. 3 schematically describes the general shape of the image that is acquired by an image capture device that is set to capture an image that is created by the optical block of the present invention.

FIG. 3 is a schematic description of the shape of the image that is acquired by the image capture device described hereinabove. As described with reference to FIG. 2, the image capture device captures an image, which is the reflection of the panoramic scene. In FIG. 3, an image (15) is acquired by the image capture device. The image (15) contains a first area (16), which is the reflection of the panoramic view and a second area (17) which is the reflection of the image capture device itself. Every light ray, which originates in the panoramic field of view surrounding the lens (1) at an elevation angle which is covered by the optical block (1), will appear in the first area (16) of the image (15). It is stressed that the image shape as indicated, describes an image as it is acquired by the image capture device in the preferable case in which the lens of the image capture device is set to capture all of, and no more than, the reflection and the reflection appears at the center of the image. The circular shape of the image, although suitable for some needs, may be considered unsuitable for standard viewing. Therefore the image is usually corrected by image processing software, designed specifically according to the parameters of the optical block. Use of the software corrects the image shape and transforms it to another shape, preferably rectangular, more suitable for viewing. It is stressed that by using the imaging assembly described by FIG. 2, the central sector (17) of the image (15) will comprise the reflection of the image capture device. Since this area of the image is actually "wasted", advanced optical designs may be used such that section (17) comprises an image of a second scene, at least partially different from the panoramic scene that appears in the outer sector (16) of the image. An example of such an advanced design is described hereinbelow with reference to an embodiment of the present invention in FIG. 4.

Figure 4:
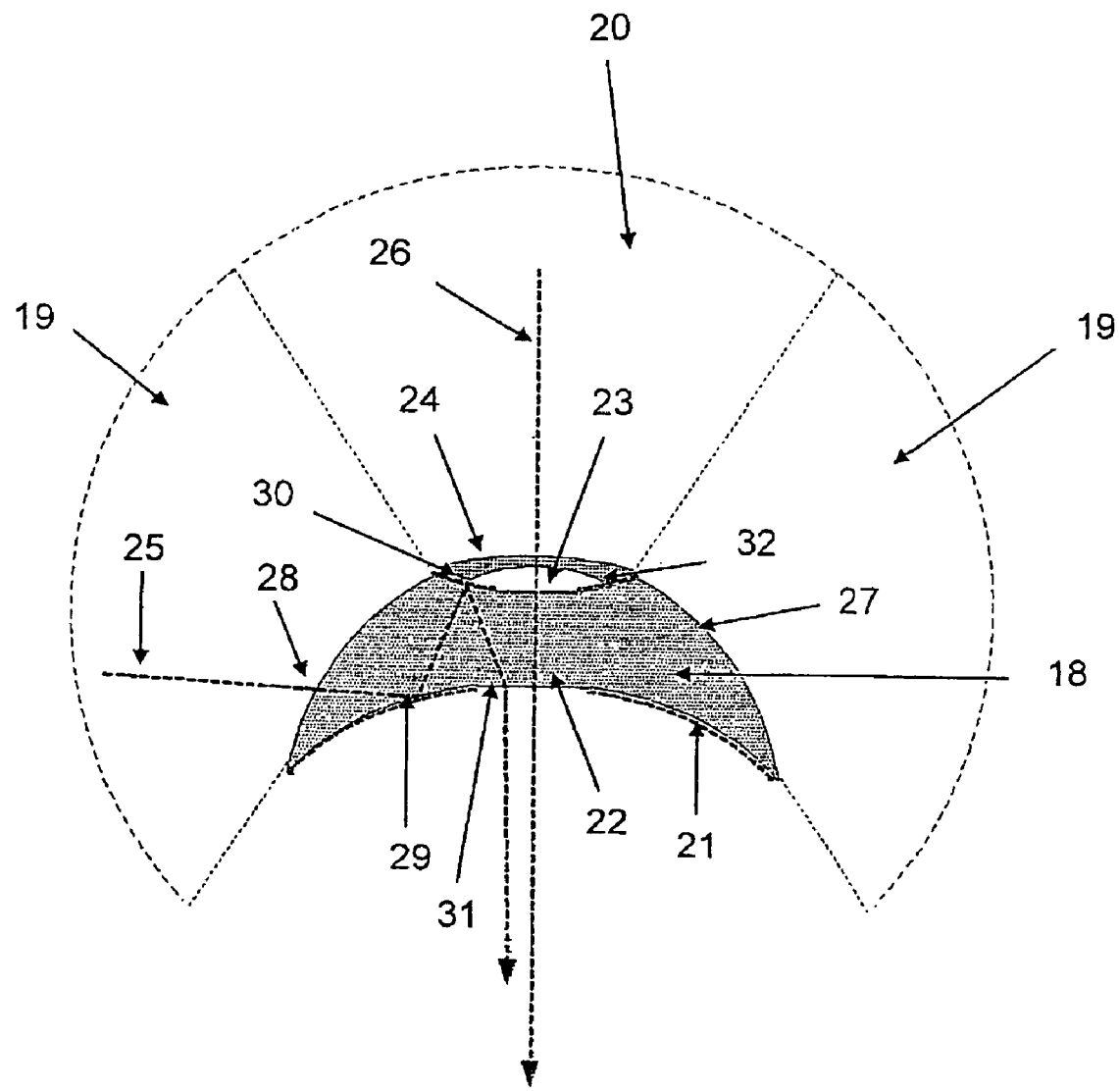
FIG. 4 schematically describes an optical block that enables coverage of a 360 degrees panoramic field of view and an additional field of view located above the panoramic field of view, and optical paths of representative light rays that travel through the optical block.

Another preferred embodiment of the present invention, shown in FIG. 4, provides an imaging assembly capable of capturing a first scene of 360 degrees panoramic surroundings and a second scene, located at least partially above the first scene. The image capture is achieved using a unique optical structure and a single image capture device. The optical structure has several possible designs as will be described with reference to the figure. Those skilled in the art will appreciate that the exact structure and the exact formulas describing the curves and optical properties of the surfaces of the optical structure of this embodiment are subject to precise optical design. Proper optical design will preserve maximum quality of the image that is acquired by the image capture device. It is further noted that the coverage ranges of the different scenes are also subject to the optical design and can be controlled by the optical design. Optical design also dictates the required distance between the optical block and the image capture device to ensure optimal focus by the image capture device on the image that arrives from the direction of the optical structure.

FIG. 4 is a schematic description showing one embodiment of a design of an optical lens (18) designed for simultaneous coverage of a first scene (19) comprising a 360 degrees panoramic surroundings and a second scene (20) which is at least partially above the first scene. The optical structure comprises a single optical element (lens) (18). The optical block (lens) (18) comprises a transparent perimeter surface (27), a transparent upper surface (32), a transparent lower convex surface (21), a transparent circular surface (22) located at the center of the transparent lower convex surface (21) and a transparent area (23) located at the center of the transparent upper surface (32).

The lower convex surface (21) is coated, in some embodiments, with reflective material on its exterior side and is designed to reflect rays, which originate in a 360 degree field of view surrounding the lens, towards the upper surface (32). The upper surface (32) is coated, in some embodiments, with reflective material on its exterior side and is designed to reflect rays, which arrive from the direction of the lower convex surface (21), towards the transparent circular surface (22) located at the center of the lower surface (21) and from there to an image capture device (not shown) located at the concave side of the optical lens (18). It is stressed that at least an area (22) of lower surface (21) should be transparent to enable rays to exits the block and reach the image capture device. It is further stressed that the upper surface (32) is not coated entirely with reflective material and a transparent area (23) is maintained in the upper surface (32), allowing light rays from the second scene (20) to penetrate the optical block (18) through said transparent area (23) and exit through said circular transparent surface (22). The geometry of the transparent area (23) may be different than that of the upper surface (32) and its shape may be designed to control the size of the upper sector (20) which is covered. It is also possible to make use of an additional optical structure (24) which is placed above the transparent area (23) and coaxially with the vertical axis of symmetry of the optical block (18). The optical structure (24) is preferably fabricated in a size that enables exact placement and fastening to the optical block (18). The additional optical structure (24), when properly designed, enables control over the size and optical qualities of second scene (20) that is covered. The additional optical structure (24) may be comprised of several separate optical elements, however, for the purpose of brevity and clarity; it is referred to as a single element.

Reference is now made to the optical paths of light rays originating in the two scenes, which are covered by the optical block (18).

A first light ray (25) represents a group of light rays originating at the panoramic scene (19). A second light ray (26) represents a group of light rays originating at the second scene (20). The first light ray (25) hits the perimeter refractive surface (27) at a first point (28), and penetrates the optical block (18). The ray (25) then travels through the optical block (18) and hits the lower surface (21) at a second point (29), where it is reflected towards the upper surface (32). The ray (25) then hits the upper surface (32) at a third point (30) and it is then reflected towards the circular transparent surface (22) hitting it at a fourth point (31) where it is refracted and exits the lens (18).

Similar paths can be described with reference to any other light ray that originates within the first scene (19). The second light ray (26) hits the additional optical structure (24) and travels through it. The ray (26) may be refracted several times, should the additional optical structure (24) be comprised of several separate optical elements. After exiting the additional optical structure (24), the ray (26) travels towards the transparent area (23). The ray (26) then hits the transparent area (23), where it is refracted and enters into the optical block (18). The ray then travels through the optical block (18) until it hits the transparent circular surface (22) where it is refracted again and exits the optical block (18). As previously indicated, the additional optical structure (24) is designed to control the size and optical qualities of the second scene that will be covered. The additional optical structure (24) may be comprised of several separate optical elements to compensate any aberrations that may be generated along the optical path of light rays that originate at the second scene. It is stressed that the optical path within the additional optical structure (24) is to be considered only if such optical structure (24) is indeed implemented. It is stressed that the transparent area (23) may be fabricated by several methods. A first method is by forming only a partial reflective coating over the transparent upper surface (32), leaving an area around the vertical axis of symmetry of the optical block uncoated, and thus allowing light rays to penetrate the optical block. Another way of fabrication of the transparent area (23) is to produce a refractive surface with different geometry than that of the transparent upper surface by imposing a different curvature on an area around the vertical axis of symmetry of the optical block. This will cause the transparent area to have different refraction qualities. A third method is by forming a hole, having a certain diameter, along the vertical axis of symmetry of the optical block to allow light rays to pass freely through said hole. However, it should be appreciated that each method will necessitate a different optical design.

The combination of an image capture device with the optical block (18) to achieve capture of the two scenes (simultaneously) may be accomplished as demonstrated with reference to FIG. 2.

Figure 5:
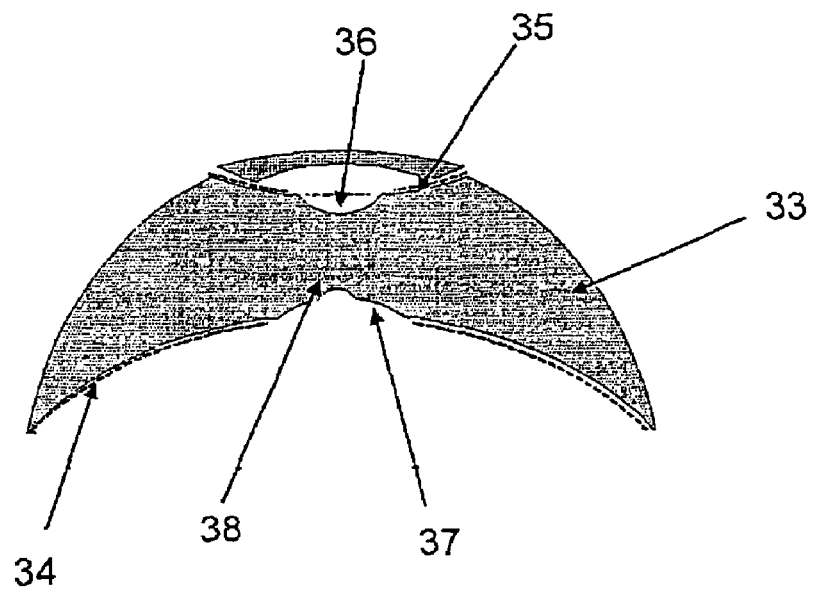
FIG. 5 schematically describes another possible design of an optical block of the present invention.

FIG. 5 is a schematic description of an embodiment of a solid optical lens (33) according to the present invention, in which the upper and lower surfaces are described by a plurality of geometric curves. The upper surface of the lens (33) has a first area (35), described by a first geometric curve, and a second area (36) described by a second geometric curve. The lower surface of the lens (33) has a first area (34) described by a first geometric curve, a second area (37) described by a second geometric curve and a third area (38) described by a third geometric curve. Each of the mentioned areas performs a different optical "task", and therefore may be designed to have a different geometric shape, such that would enable it to optimally perform its respective optical task. Reference is now made to the different optical tasks of each of the described areas. The first area (34) in the lower surface is designed to reflect light rays from the panoramic perimeter towards the first area (35) of the upper surface. The first area (35) of the upper surface is designed to reflect these rays towards the second area (37) in the lower surface. The second area (37) in the lower surface is designed to refract these rays, and enable them to exit the lens (33) and be captured by an image capture device (not shown). The second upper surface (36) is designed to refract rays from a scene, which is different than the panoramic scene. These rays should travel through the lens (33) and reach the third area (38) in the lower surface. The third area (38) in the lower surface is designed to refract these rays and enable them to exit the lens (33) and be captured by the same image capture device that captures the panoramic scene. The specific design of the curves of the surfaces directs the rays of the different scenes to occupy different areas of the focal plane array, where the image is formed.

Due to the complexity of the optical paths, and the need to optimally reflect, refract and capture rays that originate in different scenes, the use of multiple geometric curves to form the different surfaces of the lens (33) aids in the correction of aberration, astigmatism or other degradation in the image quality as well as in directing the rays to the focal plane array as required. Such an embodiment may reduce the need for using additional external lenses.

Figure 6:
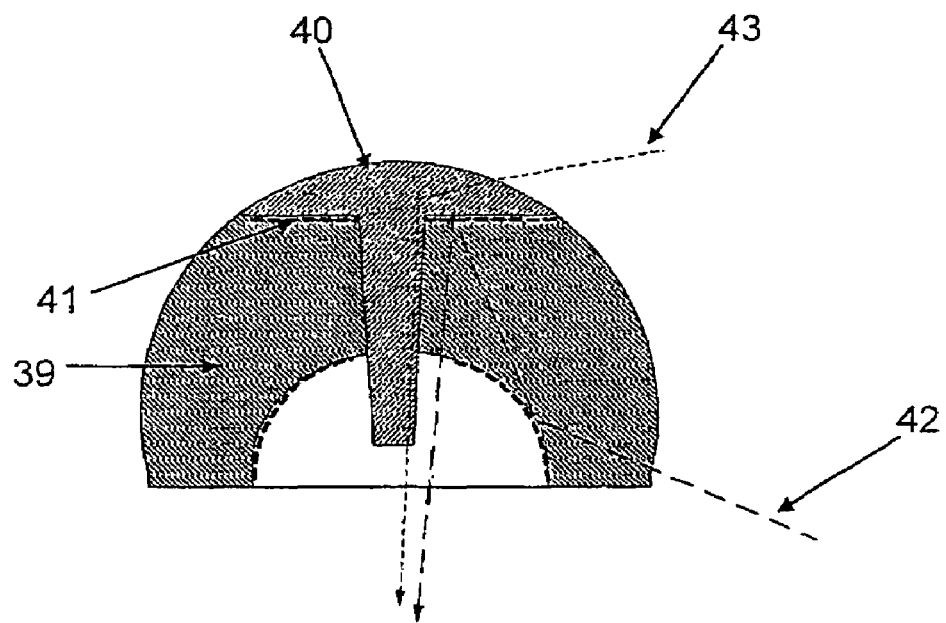
FIG. 6 schematically describes yet another possible design of an optical block of the present invention.

FIG. 6 schematically describes an additional embodiment of the optical lens of the present invention. In FIG. 6, the lens (39) is fabricated with a hole, preferably conically shaped, located along its central axis of symmetry, extending from its upper surface (41) to its lower surface. Inside the hole there is placed an additional optical structure (40) that is designed to refract rays from a scene located above the optical lens (39), a scene which is different from the panoramic scene reflected by the lens (39). The additional optical structure (40) may be comprised of multiple optical elements that would provide optimal optical performance. The shape of the additional optical structure (40) is preferably such that it can be fastened into the hole in the lens (39) and totally adjacent to the upper surface (41) of the lens (39). According to this design, the reflective coating of the upper surface (41) may be on the upper surface itself or on the area of the additional optical element (40) that is to be adjacent to the upper surface (41). A first light ray (42) represents a light ray originating in the panoramic scene, traveling through the optical lens (39). A second light ray (43) represents a ray originating in an additional scene, located above the panoramic scene.

Figure 7:
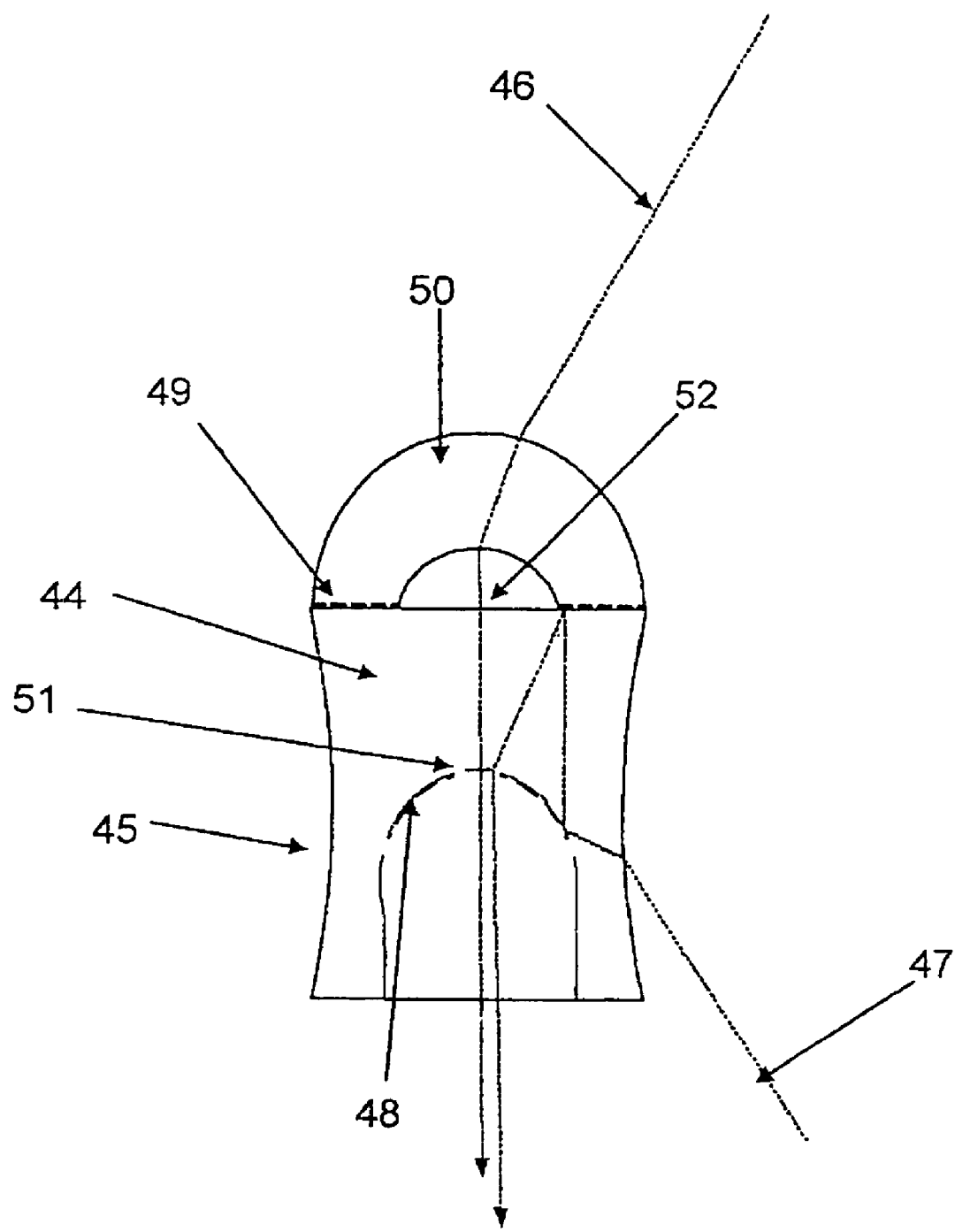
FIG. 7 schematically describes an additional possible design of an optical block of the present invention.

FIG. 7 schematically describes an additional embodiment of the lens of the present invention. According to the present figure, the lens (44) has a perimeter surface (45) described by a negative curve. An additional optical element (50) is used to refract rays from a scene located above the lens (44) and above the panoramic scene covered by the lens (44). A first light ray (46) represents a ray originating in an upper scene covered by the additional optical element (50). A second light ray (47) represents a ray originating in the panoramic scene covered by the lens (44). The second light ray (47), as well as any other ray originating in the panoramic scene that is covered by the lens (44), will penetrate the lens (44) through the perimeter surface (45), will then be reflected by the lower reflective surface (48) of the lens towards the upper surface (49). The rays will then be reflected by the upper surface (49) towards the transparent area (51) in the lower surface of the lens (44) and will exit the lens. A transparent area (52) is maintained in the upper surface to enable rays from the upper scene, which are refracted by the additional optical element (50), to enter the lens (44), travel through it and exit through the transparent area (51) in the lower surface.

Figure 8:
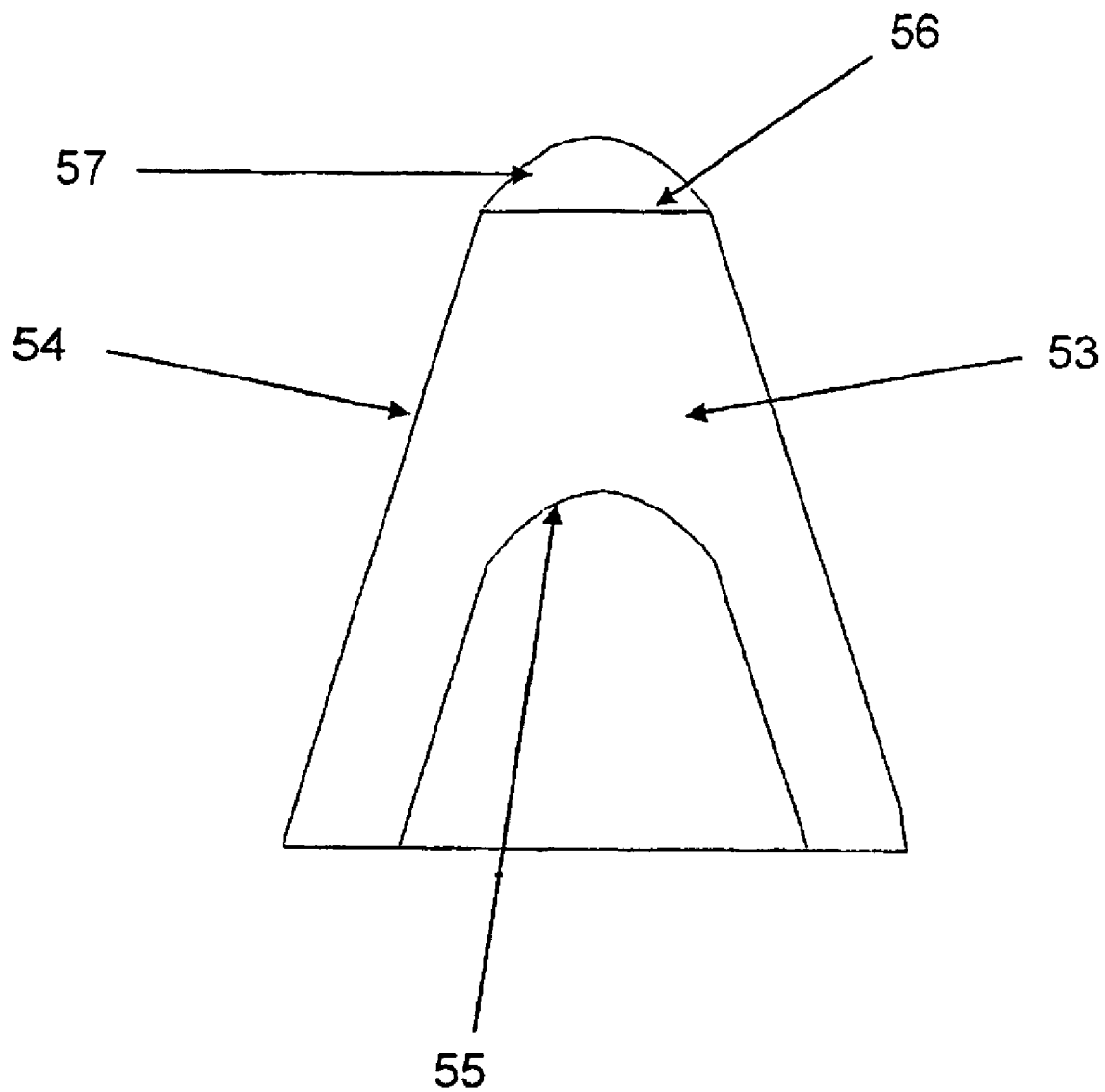
FIG. 8 schematically describes a general shape of an optical block of the present invention, having a unique shape, suitable for smooth insertion to body cavities, when implemented in medical endoscopic equipment.

During medical endoscopy procedures, the surgeon is provided with means to see inside the body for purposes of diagnosis or surgery. Endoscopic procedures are known to suffer from the relatively narrow field of view provided by prior art endoscopic equipment. The lens provided by the present invention, can be implemented as an optical head of a medical scope to enable the coverage of an omni-directional field of view, and provide the surgeon with enhanced orientation and maneuverability. Implementation of the lens of the invention as an optical head of a medical scope would require it to be shaped in a manner that would enable smooth insertion into body cavities, and minimal danger to internal organs when coming in contact with them. FIG. 8 describes schematically the general shape of one embodiment of the lens of the invention for use with an endoscope. In FIG. 8, the lens (53) consists of all of the surfaces shown in previous figures—the perimeter surface (54), the lower surface (55), the upper surface (56), and optional additional optical elements (57) designed to cover a scene different than the panoramic scene. The use of reflective surfaces has been demonstrated in reference to the pervious figures; therefore, it will not be elaborated in respect to the present figure. The design of the lens (53) in FIG. 8 must take two factors into consideration: the first and most crucial factor is a design that achieves the desired field of view and optical quality, and the second factor is the "ergonomic" shape.

Another aspect of the present invention refers to the incorporation of an illumination source with the omni-directional lens of the present invention. It will be realized that in some cases the environment in which the imaging is performed is either poorly lit or completely dark. One example of such a situation is inner-body imaging during medical endoscopy. Since it is crucial for the surgeon to see clearly the environment in which he operates, it is desired to provide illumination that would light the scene and enable clear imaging. When using an omni-directional lens, the illumination should be distributed omni-directionally to the entire scene that is to be imaged.

The present invention provides a method of illuminating the omni-directional scene by using the lens itself as an illumination distributor, as will be described hereinbelow.

Figure 9:
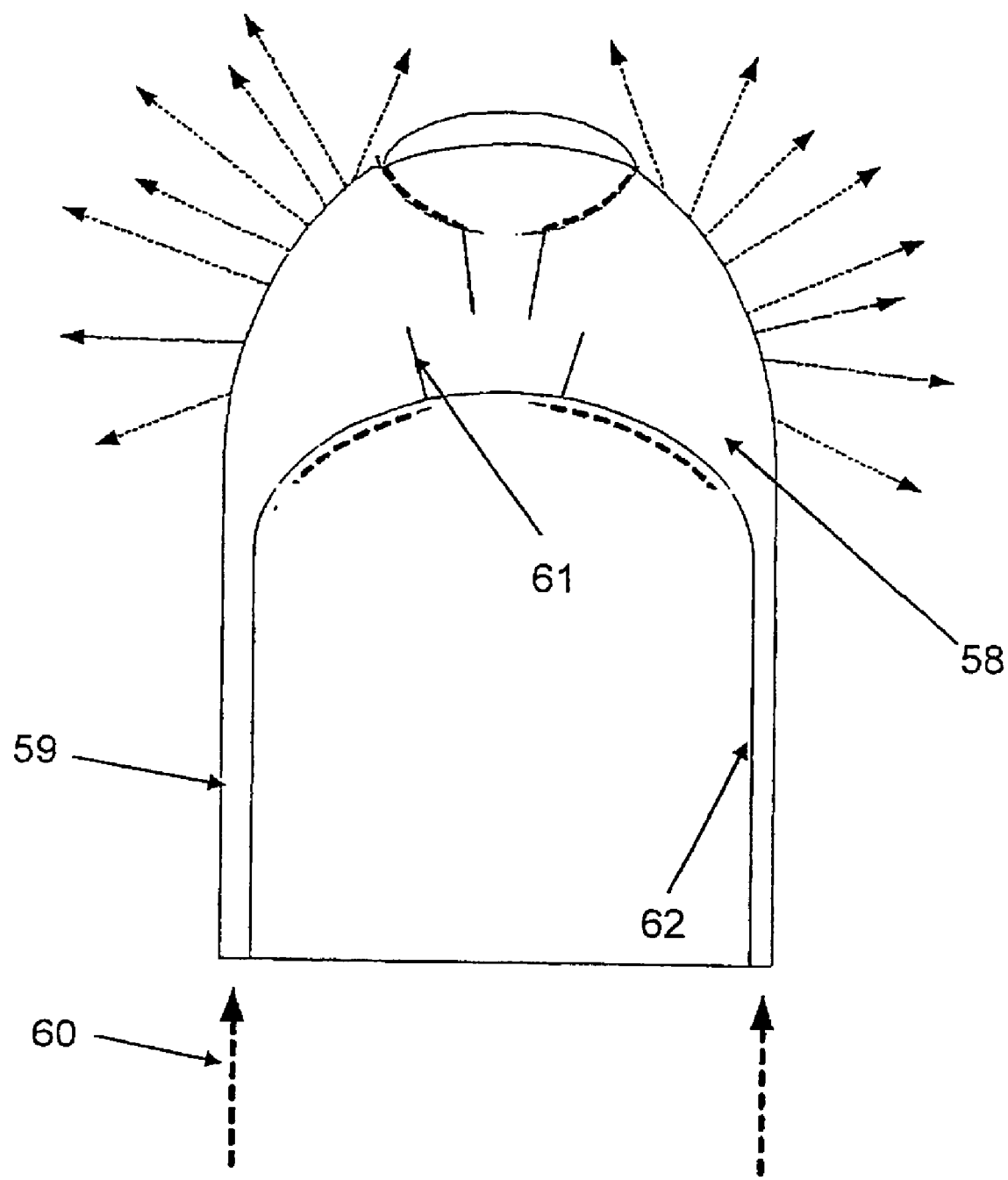
FIG. 9 schematically describes an optical block of the present invention that enables omni-directional distribution of illumination, simultaneously with coverage of the omni-directional scene.

FIG. 9 schematically describes the incorporation of an illumination source with the omni-directional lens of the present invention. In this figure the omni-directional lens (58)

has an illumination conductor area (59). The illumination conductor area can be either fabricated together and as part of the monolithic structure of the lens, or can be connected to the bottom edges of the lens (68). An illumination source (60) is attached to the illation conductor area (59), so that illumination distributed by the illumination source, penetrates the illumination conductor are (59), travels through it, and reaches the body of the lens (58). The illumination is then distributed trough the body of the lens omni-directionally. In some cases there may be "stray" light rays that will be reflected towards the image capture device, causing glare in parts of the image. To avoid glare, it is possible to fabricate cylindrical or conical slots (61) around the central axis of symmetry of the lens. The slots should be positioned so that they would not block, or interfere with the optical path of light rays that originate at the perimeter scene or at the upper scene. The slots (61) will, however, block illumination rays from entering the optical path that leads to the image capture device. It is also important to avoid stray illumination rays from exiting through the outer surface (62) of the interior wall defining conductor area (59), since those rays might also cause glare in the image captured by the image capture device. To avoid such an effect, it is possible to coat the outer surface (62) with a dark coating, or to use some kind of mechanical structure that would separate the image capture device from the possible effects of stray illumination.

Figure 10:
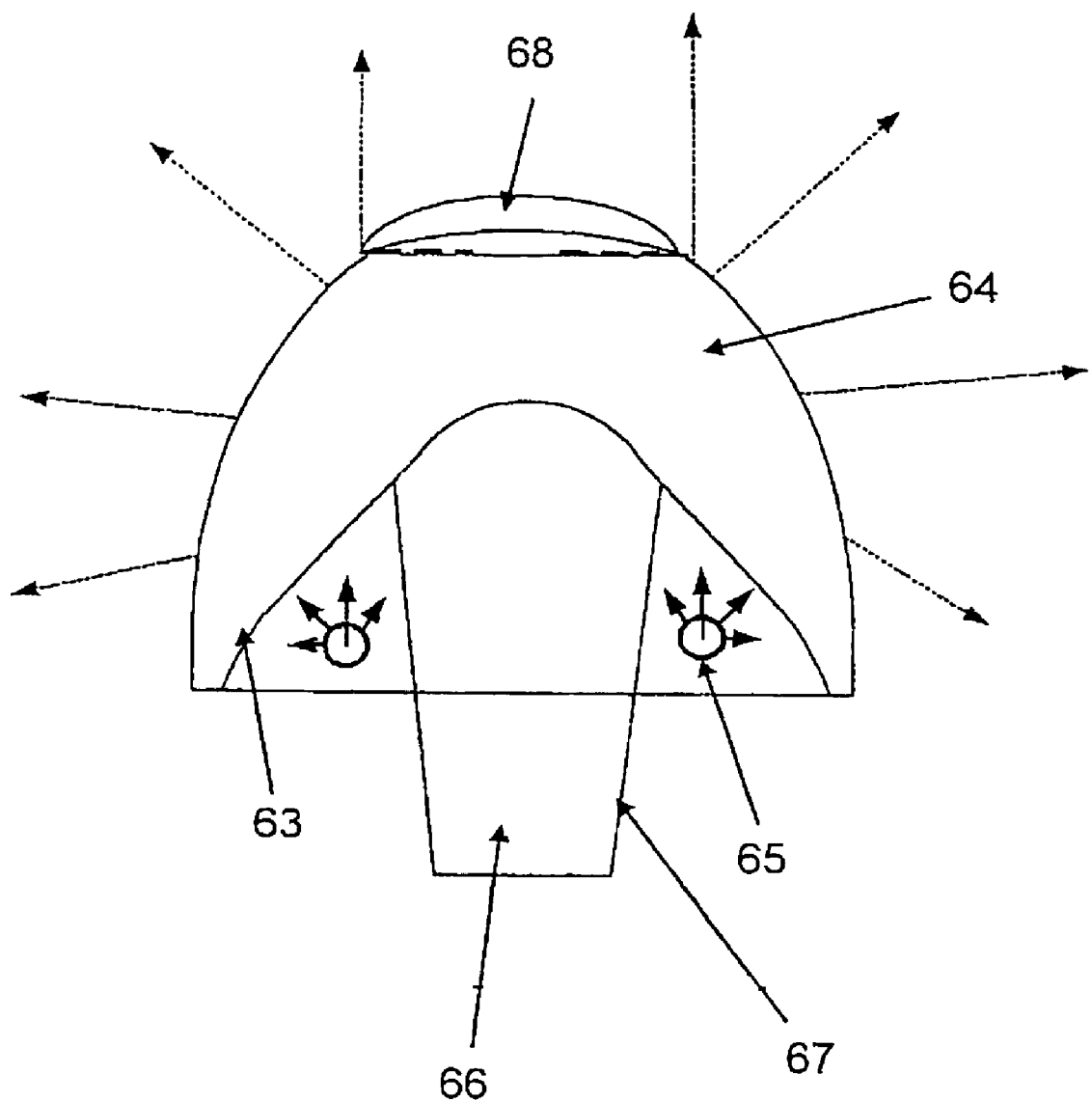
FIG. 10 schematically describes another possible method of incorporating illumination sources with the optical block of the present invention.

FIG. 10 schematically describes another embodiment of the omni-directional lens of the present invention incorporating illumination sources. As shown in FIG. 10, the lower surface (63) of the omni-directional lens (64) is not coated with reflective material. The reflection of light rays, which originate in the panoramic scene, by the lower surface, even though no reflective coating is implemented, is achieved according to Snell's Law of Total Internal Reflection. The absence of reflective material on the lower surface (63) enables incorporation of illumination sources (65) directly under the lower surface (63), where illumination can pass freely through the lower surface (63) and penetrate the body of the lens (64) and from there be distributed omni-directionally into the scene surrounding the lens. To avoid stray illumination effects, such as that caused by illumination rays arriving at the image capture device and creating glare, it is possible to incorporate a conical structure (66) which preferably has blackened outer edges (67). In the present figure, is also shown how the conical structure (66) is used for two purposes. The first purpose, as described above, is to isolate the illumination sources from the central optical channel and avoid glare. The second purpose is to use the conical structure (66) as an optical channel that is used to pass light ray from the upper scene through the lens. The rays from the upper scene are routed to the optical channel of the conical structure (66) by an upper optical structure (68). It is stressed that the upper optical structure (68) and the conical structure (66) may be fabricated as a single component, and for that purpose a hole may be fabricated in the omni-directional lens (64), through which, the said optical component can be inserted.

Figure 11:
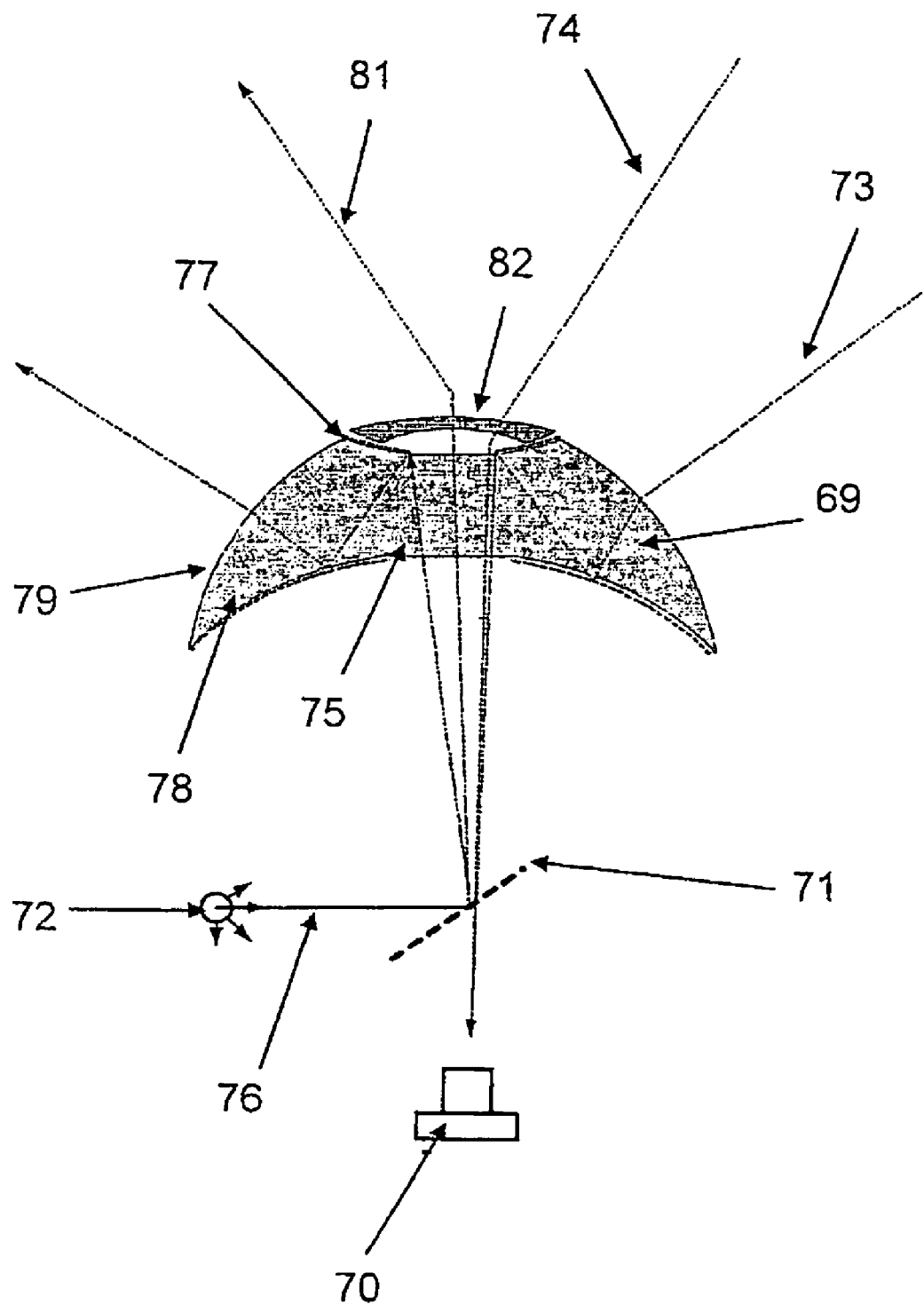
FIG. 11 schematically describes an incorporation of an optical prism and an illumination source with the optical block of the present invention.

FIG. 11 schematically describes an embodiment of the present invention incorporating an illumination source and an optical prism to achieve simultaneously omni-directional imaging and omni-directional illumination. In the present figure, the omni-directional lens (69) of the present invention is located coaxially with an image capture device (70). In between the omni-directional lens (69) and the image capture device (70) there is positioned an optical prism (71), which has different optical effects on light rays that arrive at it from different angles. At one side of the prism (71) there is positioned an illumination source (72), directed to illuminate that side of the prism. Reference is now made to optical paths of rays that travel through the prism (71). A first ray (73) represents a ray that originates in the panoramic scene which is covered by the omni-directional lens (69). A second ray (74) represents a ray that originates in an additional scene, located above the omni-directional lens (69). The first ray (73) and the second ray (74) travel through the omni-directional lens (69) in a similar way to that previously described with respect to FIG. 4. The first ray (73) and second ray (74) exit the omni-directional lens (69) through the transparent area in the lower surface (75). These rays then travel towards the optical prism (71). The angle at which these rays meet the prism (71) and the qualities of the prism (71) result in complete transmittance of these rays through the prism (71) and towards the image capture device (70). The same path and optical effects can be described in relation to any other ray that originates in the panoramic scene or the upper scene, which are covered by the omni-directional lens (69). A third ray (76) represents a ray that originates at the illumination source (72). The illumination ray (76) hits the prism (71) and is refracted upwards, towards the omni-directional lens (69). The angle in which the illumination ray (76) meet the prism (71) and the properties of the prism (69) result in the refraction of the illumination towards the direction of the omni-directional lens (69). The illumination ray (76) penetrates the omni-directional lens (69) through the transparent area in the lower surface (75) of the lens. Some illumination rays will then hit the upper reflective surface (77) of the lens, will be reflected by it towards the lower reflective surface (78), and will be reflected from there to the perimeter surface (79) and will illuminate the surrounding scene. Additional illumination rays (81) will illuminate the upper scene after traveling through the lens (69) and exiting through the optical element (82) designed to cover the upper scene. It is stressed that the shape, location and optical effects of the prism (71) as demonstrated in this figure are purely schematic. Those skilled in the art would be able to design a prism suitable for performance of the task described herein. Furthermore, the mechanical attachment of the prism to the assembly may be performed in numerous methods within the scope of those skilled in the art.

Figure 12:
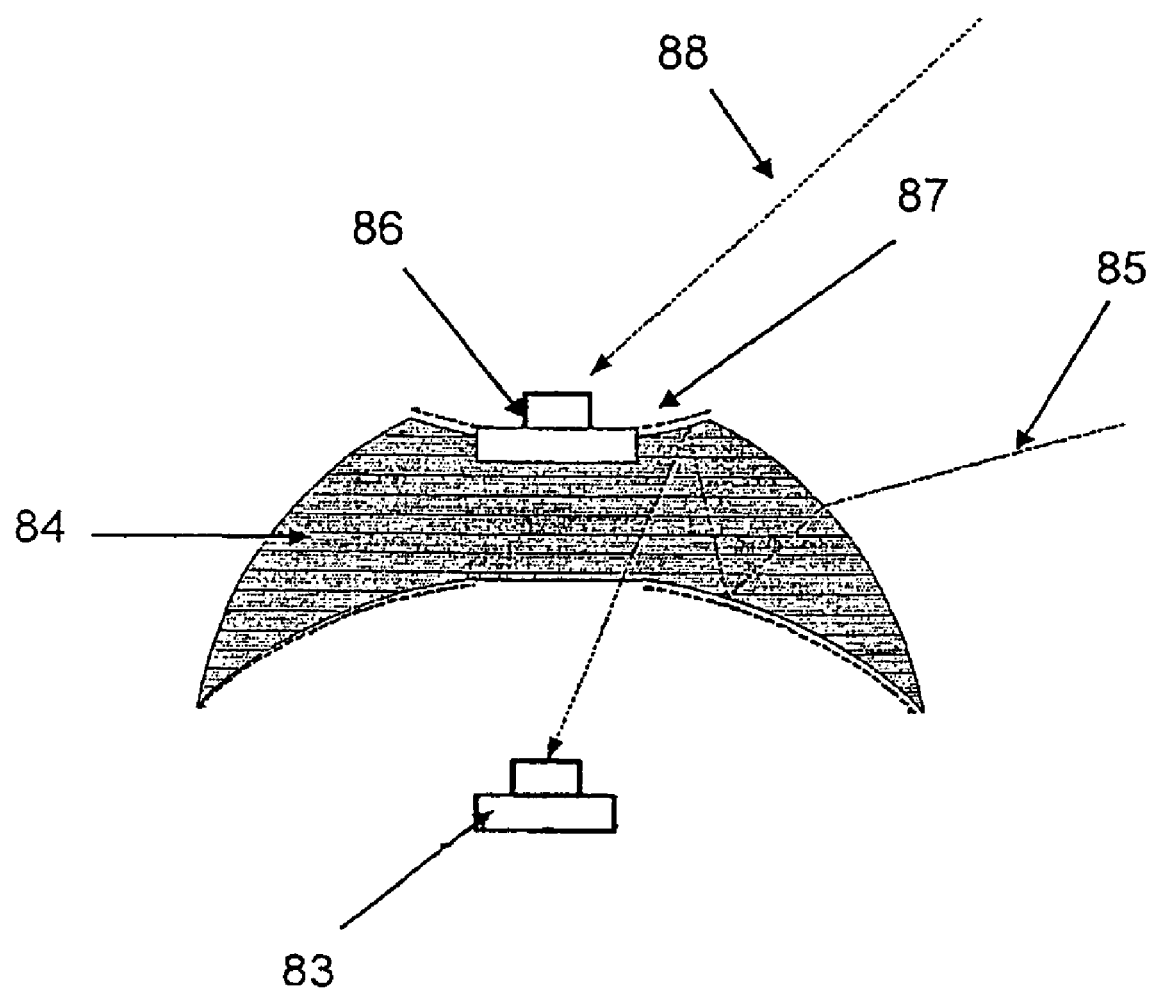
FIG. 12 schematically describes an incorporation of two image capture devices with the optical block of the present invention to provide coverage of a nearly spherical field of view.

FIG. 12 schematically describes the incorporation of two image capture devices to enable capture of two different scenes. A first image capture device (83) is directed towards an omni-directional lens (84) of the present invention. The omni-directional lens (84) and the first image capture device (83) are preferably coaxial. The omni-directional lens (84) provides coverage of a panoramic scene located around it. A first ray (85) represents a ray that originates in the panoramic scene, penetrates the lens (84), is reflected and refracted by the lens (84) and captured by the first image capture device (83). A second image capture device (86) is positioned above, and preferably adjacent to the upper surface (87) of the lens (84). The second image capture device (86) is designed to capture an additional scene, located above the panoramic scene that is captured by the first image capture device (83). A second ray (88) represents a ray that originates at the additional, upper, scene and is directly captured by the second image capture device (86). The second image capture device (86) may be equipped with additional optical lenses that enlarge the aperture of the field of view that it covers. It is stressed that the second image capture device (87) requires a power source as well as a method to transfer the image that it acquires to the user. For these purposes, the second image capture device may either have wires that are connected to it for supplying the power and transmitting the image, or it may comprise an internal power supply and a means of wireless transmission of the image If wires are implemented, they can be connected to the image capture device (86) through a hole (not shown) in the omni-directional lens or bypass the lens (84) from its exterior. In either of these embodiments the wires would cause an obstruction of a part of the scene.

Figure 13:
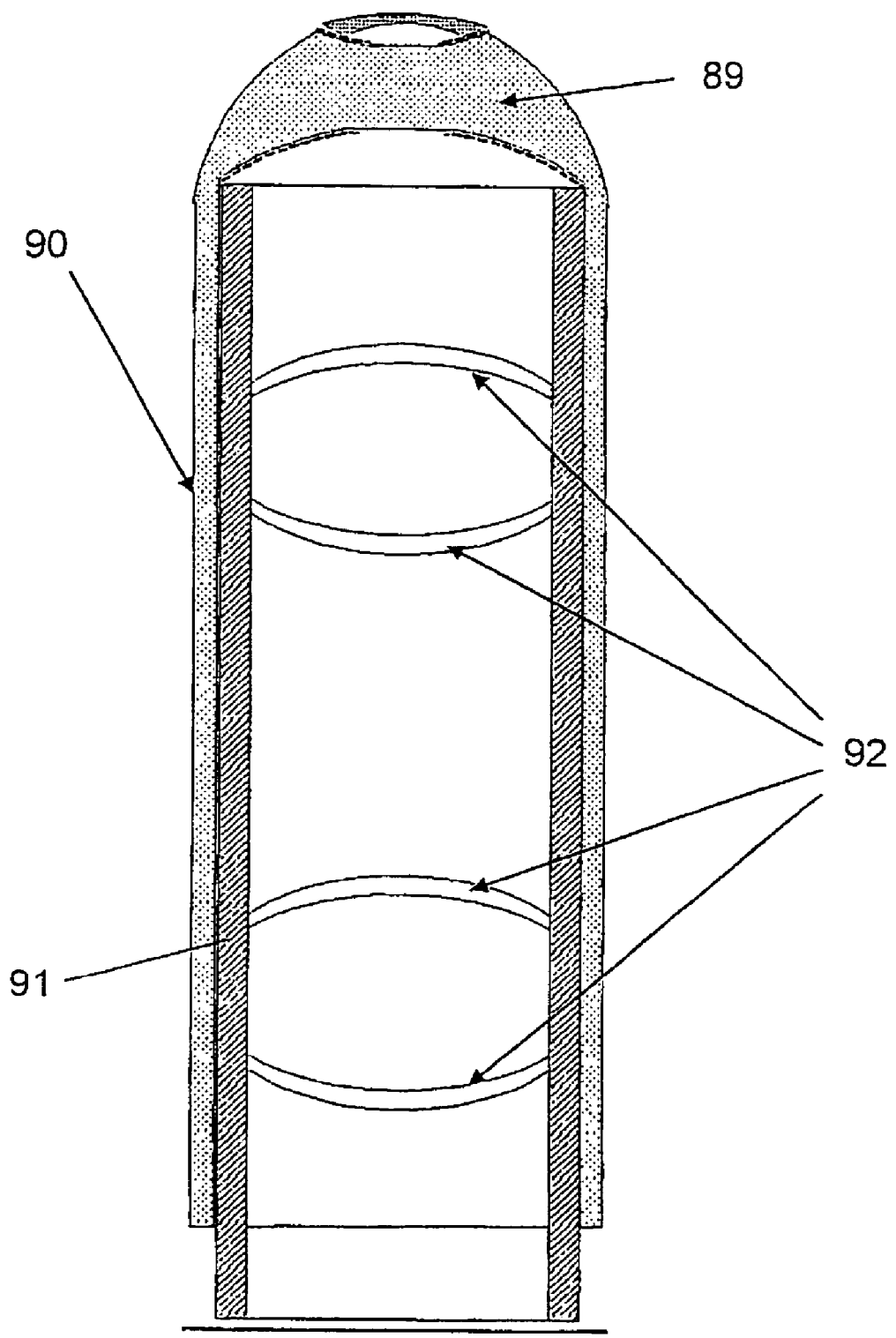
FIG. 13 schematically describes a design of the optical block of the present invention, incorporated with additional mechanical and optical components, for enhanced performance.

FIG. 13 schematically describes an additional embodiment of the omni-directional imaging assembly of the present invention. The omni-directional lens (89) shown in FIG. 13 is fabricated having monolithic edges (90) which are a continuation of the monolithic structure of the lens (89), meaning the edges (90) are fabricated as a single unified unit with the lens (89). The edges (90) can be used as an illumination conductor, as was described in reference to FIG. 9. Toward the inner side of the edges (90) there is inserted a mechanical structure (91), preferably adjacent to the edges. The mechanical structure (91) may be equipped with rod lenses (92) which may have the optical purpose of routing the image to a relatively distant focal plane array and/or correcting aberrations, astigmatism, or other optical deficiencies of the image. The embodiment described in FIG. 13 may be applicable to a wide variety of applications, including rigid endoscopy, where the lens structure (89) may be designed to be placed on an existing rigid scope, to provide for both enlarged aperture coverage, and also isolate the scope itself from the inner-body environment, to reduce the exposure of the scope to contaminants. It this case, it is also possible that the lens (89) may be a disposable component.

Figure 14:
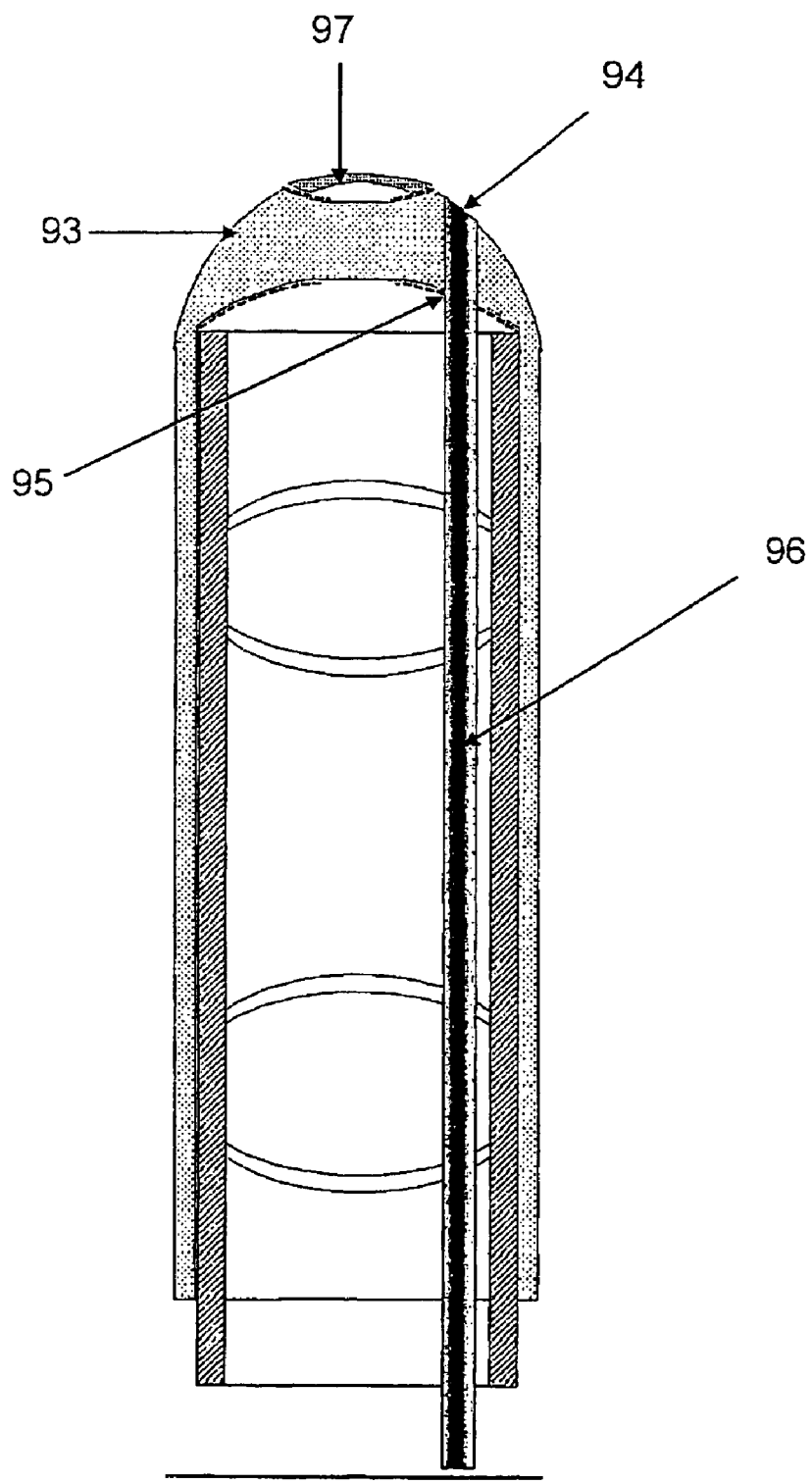
FIG. 14 schematically describes a generic method for incorporating a surgical channel within the optical block of the present invention.

FIG. 14 schematically describes an implementation of the omni-directional imaging assembly of the present invention, to medical endo-surgery applications. In FIG. 13 demonstrated an embodiment of the omni-directional lens that can be used to view the inner body and provide diagnostic capability only. Sometimes there is, however, a need to perform surgery in the same procedure. The embodiment shown in FIG. 14 incorporates a surgical channel in the imaging system that enables surgical operations to be conducted, while enjoying the benefit of the omni-directional imaging assembly of the present invention. In the present figure the omni-directional lens (93) has a hole in one area, extending through the lens from the upper surface (94) to the lower surface (95). Through the hole passes a channel (96) through which it is possible to pass surgical tools, liquids or gases as required by the surgical procedure that is performed. It is stressed that the design of the surgical channel itself has been presented in prior art, therefore the operation of the surgical tools, and the inner structure of the surgical channel is not elaborated herein. It is further stressed that more than one surgical channel may be incorporated, and several holes may be made in the lens (93) through which several surgical channels would be able to pass. However, it is important to note that each surgical channel that passes through the lens will cause an obstruction to the panoramic field of view that is supposed to be covered by the lens. Such obstruction may be regarded as negligible, since the surgery itself is to be done on the "front" field of view, which is covered by the additional optical element (97), whose performance is not compromised by the presence of the surgical channel. The surgical channel may also be used for passing gases, liquids, or mechanical devices through the lens to clean its exterior surface which may become obscured during a surgical procedure.

Figure 15:
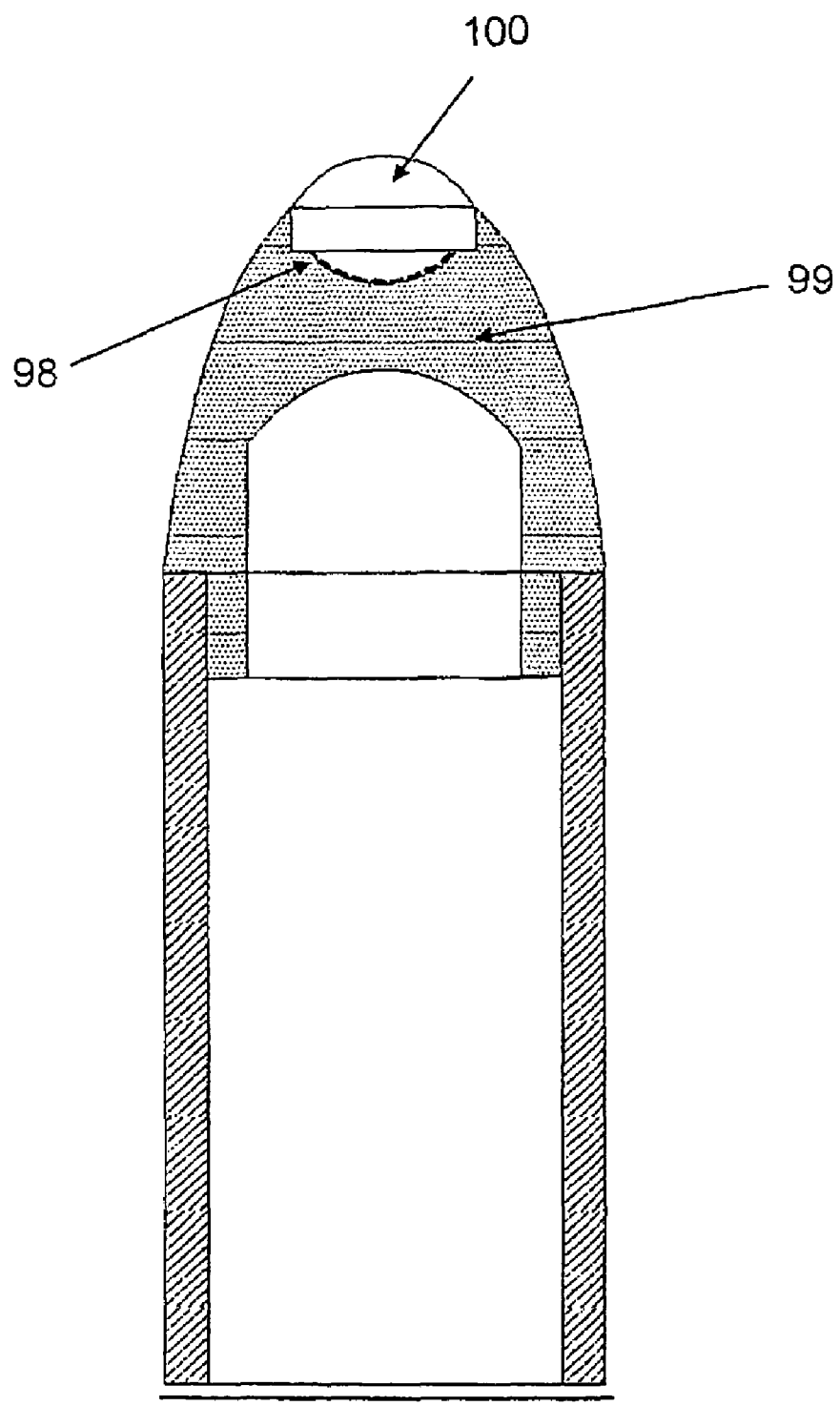
FIG. 15 schematically describes a method for protecting the outer upper optical coating on the optical block.

FIG. 15 schematically describes a method of protecting the coating of the upper surface of the omni-directional lens of the present invention. In this figure, the upper surface (98) of the omni-directional lens (99) is completely coated with reflective material on its exterior side. Exposure of the reflective coating to environmental conditions for a long period of time can result in degradation of its performance caused by cracking and peeling of the coating and the formation of bacteria on it. It is therefore desired to provide a shield that would protect the coating from the surrounding environment. In FIG. 15 is shown a shield (100) that is placed on the concave upper surface (99), preferably adjacent to the upper surface. The reflective coating may be on the concave upper surface (98) of the lens (99) or on the convex side of the shield (100) that is to be adjacent to the upper surface (98) of the lens (99). Although this figure shows an embodiment in which the upper surface (98) is completely coated with reflective material, there have been described herein some embodiments in which the upper surface is only partly coated, leaving a central area in the upper surface uncoated to allow an upper scene to penetrate the omni-directional lens (99). In this case, shield (100) may comprise an optical element used to enhance the coverage of the upper scene.

All the above description of preferred embodiments has been provided only for the purpose of illustration, and is not intended to limit the invention in any way. As will be appreciated by the skilled person, variations and modification are possible, without exceeding the scope of the invention.

The invention claimed is:

1. An omni-directional imaging assembly comprising a solid omni-directional lens said omni-directional lens comprising:
   (a) a vertical axis of symmetry;
   (b) an upper surface, at least part of which is capable of reflecting rays that arrive from the inner side of the omni-directional lens;
   (c) a transparent perimeter surface;
   (d) a lower convex surface, at least part of which is capable of reflecting rays that arrive from the direction of said perimeter surface;
   (e) a transparent circular surface maintained in said lower convex surface around said vertical axis of symmetry;
   wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens; and
   wherein the curvature of the upper surface and/or the curvature of the lower convex surface of said omni-directional lens and the material of which said omni-directional lens is made are selected to enable Total Internal Reflection of rays that arrive at said surfaces, without the use of a reflective coating.

2. An omni-directional imaging assembly according to claim 1, further comprising an illumination source located adjacent to the transparent area in the lower convex surface, said illumination source distributing illumination towards the interior of the omni-directional lens, which refracts and reflects said illumination rays distributing them omni-directionally, thereby providing omni-directional illumination.

3. An omni-directional imaging assembly comprising a solid omni-directional lens said omni-directional lens comprising:
   (a) a vertical axis of symmetry;
   (b) an upper surface, at least part of which is capable of reflecting rays that arrive from the inner side of the omni-directional lens;
   (c) a transparent perimeter surface;
   (d) a lower convex surface, at least part of which is capable of reflecting rays that arrive from the direction of said perimeter surface;
   (e) a transparent circular surface maintained in said lower convex surface around said vertical axis of symmetry;

wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens;

said omni-directional imaging assembly further comprising a second transparent circular area maintained in the upper surface of the omni-directional lens around the vertical axis of symmetry; said second transparent circular area enabling penetration of rays from a second scene, at least partially different than the first scene, into said omni-directional lens, wherein rays from said second scene travel through said omni-directional lens, are refracted by the transparent circular surface in the lower surface, and exit said omni-directional lens.

4. An omni-directional imaging assembly according to claim 3, further comprising an optical structure located coaxially with the omni-directional lens and above the upper surface of said lens; said optical structure comprising refracting and/or reflecting surfaces having curvatures that control and enhance the optical qualities of the second scene, before rays originating in said second scene are refracted by the second transparent circular area.

5. An omni-directional imaging assembly according to claim 4, wherein the optical structure comprises refracting and/or reflecting surfaces having curvatures that control the aperture of the second scene.

6. An omni-directional imaging assembly according to claim 4, wherein the optical structure comprises a plurality of optical elements.

7. An omni-directional imaging assembly according to claim 3, further comprising a hole extending from the upper surface of the omni-directional lens to the lower convex surface around the vertical axis of symmetry, wherein said hole has a diameter that allows rays from the second scene to travel through said hole thereby passing through said omni-directional lens.

8. An omni-directional imaging assembly according to claim 7, further comprising an optical element placed within the hole, wherein said optical element comprises refracting and/or reflecting surfaces having curvatures that control the quality of the image of the second scene.

9. An omni-directional imaging assembly according to claim 8, wherein the outside surface of the optical element that is placed in the hole is coated with black coating to absorb light and prevent glare.

10. An omni-directional imaging assembly according to claim 7, wherein the surface of the hole is coated with black coating to absorb light and prevent glare.

11. An omni-directional imaging assembly according to claim 7, wherein the hole is cylindrical in shape.

12. An omni-directional imaging assembly according to claim 7, wherein the hole is conical in shape.

13. An omni-directional imaging assembly comprising a solid omni-directional lens said omni-directional lens comprising:
  (a) a vertical axis of symmetry;
  (b) an upper surface, at least part of which is capable of reflecting rays that arrive from the inner side of the omni-directional lens;
  (c) a transparent perimeter surface;
  (d) a lower convex surface, at least part of which is capable of reflecting rays that arrive from the direction of said perimeter surface;
  (e) a transparent circular surface maintained in said lower convex surface around said vertical axis of symmetry;

Wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens;

said omni-directional imaging further comprising an image capture device, directed towards the transparent circular surface in the lower surface of the omni-directional lens and having its optical axis coinciding with the vertical axis of symmetry of said omni-directional lens and a connector located between the omni-directional lens and the image capture device, said connector having a first edge and a second edge, wherein optical transparency exists between said first edge and said second edge, allowing light penetrating said first edge to reach and exit through said second edge essentially without distortion.

14. An omni-directional imaging assembly according to claim 13, wherein the second edge of the connector is connected to the image capture device.

15. An omni-directional imaging assembly according to claim 13, wherein the distance between the first edge of the connector and the second edge allows optimal focus by the image capture device of the image that arrives from the direction of the omni-directional lens.

16. An omni-directional imaging assembly according to claim 13, wherein the connector is fabricated together with, and as a part of, the omni-directional lens as a unified optical block.

17. An omni-directional imaging assembly according to claim 13, wherein the side edges of the connector have a transparent volume allowing rays that arrive from the second edge to travel through said side edges, to exit through the first edge, and to enter the omni-directional lens.

18. An omni-directional imaging assembly according to claim 17, further comprising an illumination source located adjacent to the second edge of the connector, said illumination source transmitting illumination towards the transparent volume of said connector; wherein illumination rays travel through said transparent volume of said connector, penetrate the omni-directional lens, and are distributed omni-directionally by the reflective and refractive surfaces of said omni-directional lens, thereby providing omni-directional illumination.

19. An omni-directional imaging assembly according to claim 18, wherein the illumination source comprises a plurality of illumination sources.

20. An omni-directional imaging assembly according to claim 19, wherein the illumination source is capable of illumination at several different wavelengths.

21. An omni-directional imaging assembly according to claim 18, wherein the fabrication material and coating material of the omni-directional lens are transparent to the spectral range of the illumination.

22. An omni-directional imaging assembly according to claim 13, wherein the outer surface of the side of the connector is blackened by a coating or by the presence of a mechanical element, thereby absorbing light and preventing glare.

23. An omni-directional imaging assembly according to claim 13, wherein the connector is cylindrical in shape.

24. An omni-directional imaging assembly according to claim 13, wherein the first edge of the connector is connected to the omni-directional lens.

25. An omni-directional imaging assembly comprising a solid omni-directional lens said omni-directional lens comprising:

(a) a vertical axis of symmetry;
(b) an upper surface, at least part of which is capable of reflecting rays that arrive from the inner side of the omni-directional lens;
(c) a transparent perimeter surface;
(d) a lower convex surface, at least part of which is capable of reflecting rays that arrive from the direction of said perimeter surface;
(e) a transparent circular surface maintained in said lower convex surface around said vertical axis of symmetry;
Wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens;
said omni-directional imaging assembly further comprising cylindrical slots in the body of the omni-directional lens around the axis of symmetry, said slots formed in size and angle so as to not interfere with the optical path of rays originating in scenes that should be covered by said omni-directional lens; wherein said slots absorb light and prevent glare.

26. An omni-directional imaging assembly comprising a solid omni-directional lens said omni-directional lens comprising:
(a) a vertical axis of symmetry;
(b) an upper surface, at least part of which is capable of reflecting rays that arrive from the inner side of the omni-directional lens;
(c) a transparent perimeter surface;
(d) a lower convex surface, at least part of which is capable of reflecting rays that arrive from the direction of said perimeter surface;
(e) a transparent circular surface maintained in said lower convex surface around said vertical axis of symmetry;
wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens;
said omni-directional imaging assembly further comprising a prism and an illumination source; wherein said prism is located coaxially with the omni-directional lens and said illumination source is located to the side of said prism and directed towards said prism; wherein the shape of said prism, the reflectivity of its surfaces, and its location and orientation are selected so as to transmit rays that arrive from the direction of said omni-directional lens to the desired location and to refract illumination rays originating at said illumination source towards said omni-directional lens.

27. An omni-directional imaging assembly comprising a solid omni-directional lens said omni-directional lens comprising:
(a) a vertical axis of symmetry;
(b) an upper surface, at least part of which is capable of reflecting rays that arrive from the inner side of the omni-directional lens;
(c) a transparent perimeter surface;
(d) a lower convex surface, at least part of which is capable of reflecting rays that arrive from the direction of said perimeter surface;
(e) a transparent circular surface maintained in said lower convex surface around said vertical axis of symmetry;
wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens; and
wherein the omni-directional lens further comprises a hole to the side of the vertical axis of symmetry, said hole extending from the upper surface to the lower surface of said lens; wherein said hole comprises a mechanical channel.

28. An omni-directional imaging assembly according to claim 27, wherein the dimensions and location of the mechanical channel allow the passage of gases, liquids, or mechanical devices for cleaning the exterior of the omni-directional lens.

29. An omni-directional imaging assembly according to claim 27, wherein the dimensions and location of the mechanical channel allow the passage of surgical instruments through the omni-directional lens.

30. An omni-directional imaging assembly comprising a solid omni-directional lens omni-directional lens comprising:
(a) a vertical axis of symmetry;
(b) an upper surface, at least part of which is capable of reflecting rays that arrive from the inner side of the omni-directional lens;
(c) a transparent perimeter surface;
(d) a lower convex surface, at least part of which is capable of reflecting rays that arrive from the direction of said perimeter surface;
(e) a transparent circular surface maintained in said lower convex surface around said vertical axis of symmetry;
wherein light rays from a first 360 degrees, panoramic, scene are refracted by said transparent perimeter surface, are then reflected by said lower convex surface towards said upper surface, and then reflected by said upper surface towards said transparent circular surface, then refracted and exit said omni-directional lens;
further comprising an image capture device, directed towards the transparent circular surface in the lower surface of the omni-directional lens and having its optical axis coinciding with the vertical axis of symmetry of said omni-directional lens.

31. An omni-directional imaging assembly according to claim 30, further comprising an image capture device located above and adjacent to said upper surface, directed opposite to the omni-directional lens, said image capture device capturing images of an additional scene, at least partially different from the first scene.

* * * * *